(No Model.)
E. CHRISTIE.
WAFFLE IRON.
No. 394,058. Patented Dec. 4, 1888.
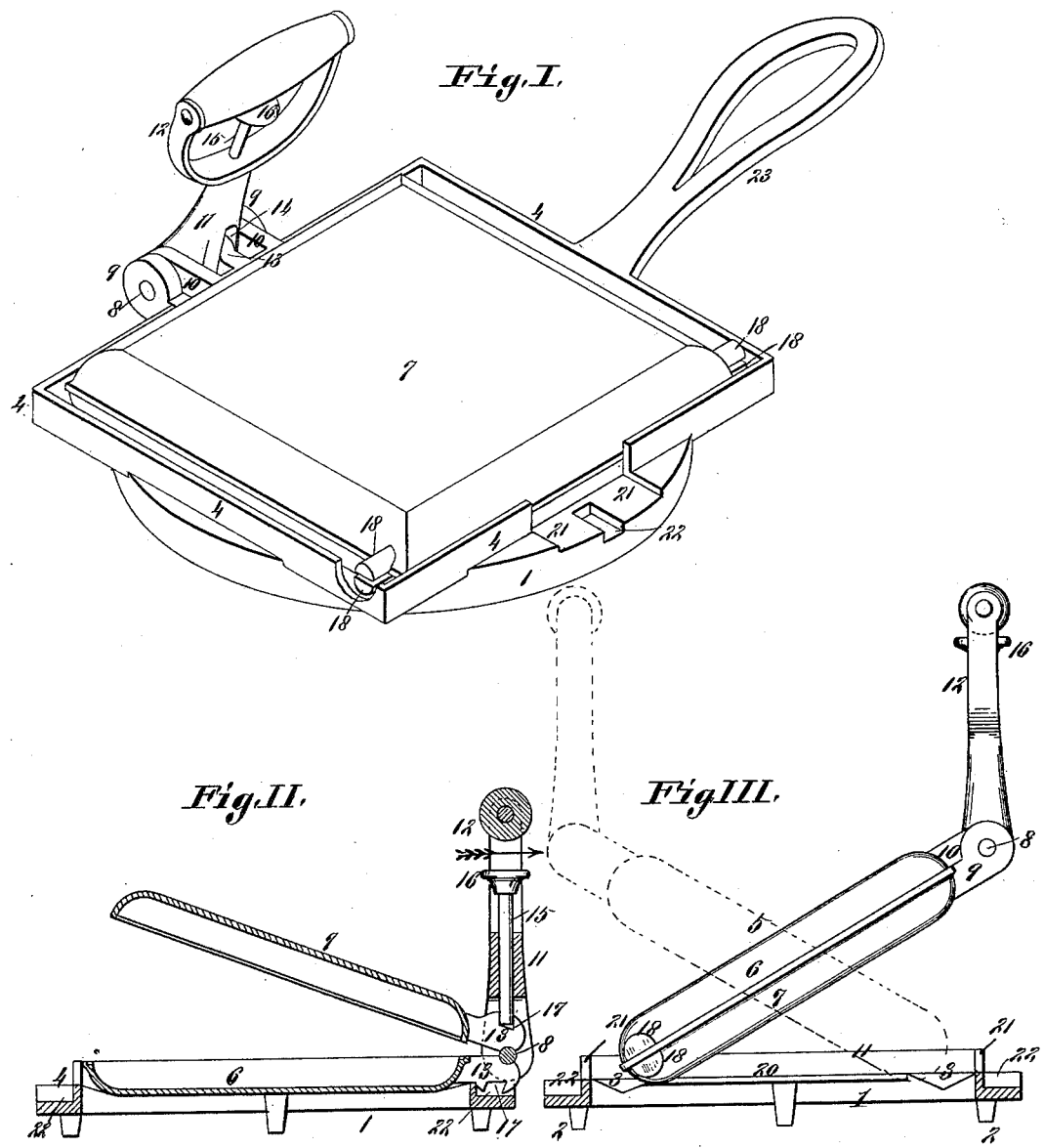
Attest:
Charles Pickles,
E. Arthur.
Inventor:
Ebenezer Christie,
By Knight Bros.
Atty's.

UNITED STATES PATENT OFFICE.

EBENEZER CHRISTIE, OF ST. LOUIS, MISSOURI.

WAFFLE-IRON.

SPECIFICATION forming part of Letters Patent No. 394,058, dated December 4, 1888.

Application filed February 7, 1888. Serial No. 263,205. (No model.)

*To all whom it may concern:*

Be it known that I, EBENEZER CHRISTIE, of the city of St. Louis, in the State of Missouri, have invented a certain new and useful Improvement in Waffle-Irons, of which the following is a full, clear, and exact description, reference being had to the accompanying drawings, forming part of this specification, and in which—

Figure I is a perspective view of my improved waffle-iron. Fig. II is a vertical section. Fig. III is a side view showing the base in section.

My invention relates to an improvement in waffle-irons; and my invention consists in features of novelty, hereinafter fully described, and pointed out in the claims.

Referring to the drawings, 1 represents a base provided with a flange, 2, to fit in a pothole or other opening. This base is preferably made rectangular, and is provided on each side, near the corners, with notches or grooves 3 to receive the journals or gudgeons of the iron, and it is also preferably provided with a marginal flange, 4.

5 represents the iron, consisting of two leaves, 6 and 7, which are hinged or jointed together at one edge, as shown at 8, and which fit within the flange 4 of the base. The leaf 7 has projections or ears 9, and the leaf 6 has projections or ears 10, through which the connecting-pin 8 passes. Mounted on this pin is also a stem, 11, with a handle, 12, on its upper end. Each leaf has a central ear or projection, 13, extending therefrom into an opening or slot, 14, made in the lower end of the stem 11.

15 represents a pin fitting loosely in a hole made longitudinally through the stem 11, and which is provided with a head, 16, on its upper end. Each projection 13 has a notch, 17, into which the pin 15 drops, as shown in Fig. II. At each side of the iron, near the edge remote from the handle 11, each leaf is provided with a gudgeon or journal, 18, which fits in the notches 3 of the base.

The operation of my improved iron is as follows: When it is to be turned, the leaves are raised up by the handle from the position shown in Fig. II to the position shown in Fig. III, and moved over on the journals into the position shown by dotted lines in Fig. III. They are then lowered again into the position shown in Fig. II, the leaf 6 being down, instead of the leaf 7. Before commencing to thus move the leaves the pin 15 is raised by grasping it with the fingers under the head 16, out of the notch 17, and when it is reversed the pin will drop into the other notch of its own weight. When it is desired to open the leaves, the handle is moved (without taking hold of the pin 15) in the direction indicated by the arrow in Fig. II, which lifts the uppermost leaf.

With a waffle-iron thus constructed it will be seen that no space is needed or required beneath the line 20 of the base, as the iron does not turn on a central pivot, as heretofore, but its journals slide with the irons on the flanges or projections 20 from side to side of the base.

With the handle constructed as I have it it is not liable to get out of order, and is not liable to be disengaged from its notch in an attempt to open the leaves.

The base 1, with its flange 4, is preferably notched out at each side, as shown at 21, to receive the ears or projections 9 10, and there is also preferably a notch, 22, in the base 1, to receive the ear or projection 13, to avoid danger of the leaves slipping on the base as one of them is raised to open them. The base may be provided with a suitable handle, 23.

My improved waffle-iron may be used on a cooking-stove, gasoline-stove, or other heater, and as the leaves do not turn on a central pivot and no part of them turn beneath the line of the base, they may be situated very near or close down upon the flame or heat.

I claim as my invention—

1. In a waffle-iron, the combination of the base provided with slideways, and the two leaves provided with a hinged handle, substantially as and for the purpose set forth.

2. In a waffle-iron, the combination of the base, two leaves, 6 7, hinged together and provided with notched ears or projections 13, a handle pivoted to the leaves, and a drop-pin secured in the handle and having engagement with the notches of the ears or projections, substantially as and for the purpose set forth.

3. In a waffle-iron, the base provided with notches 3 and flanges or projections 20, leaves 6 and 7, provided with gudgeons 18, and with ears or projections 9 10, pivotally connected, and a handle connected with the ears, substantially as and for the purpose set forth.

4. In a waffle-iron, the combination of the base having notches 3, 21, and 22, flanges 4 and 20, leaves 6 and 7, provided with gudgeons 18 on one side and ears or projections 9, 10, and 13 on the other side, a handle having an opening, 14, and pivoted to the projections 9 10, and a drop-pin in the handle to engage notches in the projections or ears 13, substantially as and for the purpose set forth.

EBENEZER CHRISTIE.

In presence of—
SAML. KNIGHT,
EDWD. S. KNIGHT.